US008346743B2

(12) United States Patent
Pfuntner et al.

(10) Patent No.: US 8,346,743 B2
(45) Date of Patent: Jan. 1, 2013

(54) CONFIGURING DATA COLLECTION RULES IN A DATA MONITORING SYSTEM

(75) Inventors: John C. Pfuntner, Holly Springs, NC (US); Isaac J. Graf, Flushing, NY (US)

(73) Assignee: International Business Machines Corporation, Armonk, NY (US)

(*) Notice: Subject to any disclaimer, the term of this patent is extended or adjusted under 35 U.S.C. 154(b) by 851 days.

(21) Appl. No.: 12/233,256

(22) Filed: Sep. 18, 2008

(65) Prior Publication Data

US 2010/0070447 A1 Mar. 18, 2010

(51) Int. Cl.
G06F 7/00 (2006.01)
G06F 17/00 (2006.01)

(52) U.S. Cl. ........................................ 707/702
(58) Field of Classification Search ............... 707/649, 707/696, 702
See application file for complete search history.

(56) References Cited

U.S. PATENT DOCUMENTS

| | | | |
|---|---|---|---|
| 4,628,434 A | 12/1986 | Tashiro et al. | |
| 5,216,592 A | 6/1993 | Mann et al. | |
| 6,154,787 A | 11/2000 | Urevig et al. | |
| 6,484,159 B1 * | 11/2002 | Mumick et al. | 1/1 |
| 6,745,382 B1 | 6/2004 | Zothner | |
| 6,763,352 B2 | 7/2004 | Cochrane et al. | |
| 7,007,023 B2 | 2/2006 | Huynh et al. | |
| 7,058,924 B2 * | 6/2006 | Greenstein | 717/100 |
| 7,281,018 B1 * | 10/2007 | Begun et al. | 1/1 |
| 7,302,400 B2 * | 11/2007 | Greenstein | 705/7.12 |
| 7,349,862 B2 | 3/2008 | Palmer et al. | |
| 7,469,290 B1 * | 12/2008 | Liubovich et al. | 709/225 |
| 7,512,578 B2 * | 3/2009 | Abnous et al. | 706/47 |
| 7,533,026 B2 * | 5/2009 | Greenstein et al. | 705/1.1 |
| 7,562,022 B2 * | 7/2009 | Greenstein | 705/1.1 |
| 7,730,068 B2 * | 6/2010 | Sarnowicz et al. | 707/738 |
| 7,739,122 B2 * | 6/2010 | Greenstein et al. | 705/1.1 |
| 7,917,591 B2 * | 3/2011 | Vakkalanka | 709/206 |
| 2004/0039728 A1 * | 2/2004 | Fenlon et al. | 707/1 |
| 2005/0055659 A1 * | 3/2005 | Croke et al. | 716/19 |
| 2006/0161466 A1 * | 7/2006 | Trinon et al. | 705/7 |
| 2006/0233311 A1 | 10/2006 | Adams et al. | |
| 2006/0233313 A1 | 10/2006 | Adams et al. | |
| 2007/0282986 A1 * | 12/2007 | Childress et al. | 709/223 |
| 2008/0037854 A1 * | 2/2008 | Grossman et al. | 382/135 |
| 2008/0313207 A1 * | 12/2008 | Modad et al. | 707/102 |
| 2009/0157723 A1 * | 6/2009 | De Peuter et al. | 707/102 |
| 2009/0248712 A1 * | 10/2009 | Yuan | 707/100 |
| 2009/0299940 A1 * | 12/2009 | Hayes et al. | 706/47 |

* cited by examiner

*Primary Examiner* — Jeffrey A Burke
(74) *Attorney, Agent, or Firm* — Fox Rothschild, LLP; Robert J. Sacco

(57) ABSTRACT

A computer implemented method of adjusting a monitoring system having data collection nodes with instances of templates for collecting data according to data collection rules includes receiving a data propagation path specifying a hierarchy for at least a portion of the templates, the hierarchy specifying a child template, parent templates for the child template, and an order for the parent templates. The method also includes specifying an event data collection rule for the first child template and configuring parent data collection rules for the parent templates accordingly. The parent data collection rules include a data retrieval rule for retrieving event data associated with the event data collection rule or a data aggregation rule for combining the event data associated with the event data collection rule and multiple instances of the child template. The method also includes updating the instances in the data collection nodes.

18 Claims, 5 Drawing Sheets

100

300

US 8,346,743 B2

CONFIGURING DATA COLLECTION RULES IN A DATA MONITORING SYSTEM

FIELD

The present invention relates to a data monitoring systems, and more specifically to systems and methods for configuring data collection rules in a data monitoring system.

BACKGROUND

In some types of data monitoring systems including a large number of nodes for data collection, the data collection generally occurs according to a tree-type structure of data collection processes that defines the flow of data from one node to the other. For example, in a business service model, a parent data collection node can include data collection processes having numeric incoming status rules that define which data needs to be collected from the other nodes connected to the data collection node and how to aggregate the numeric results from multiple nodes. Typically, these aggregate results are needed, but by several data collection nodes higher in the tree-type structure. Accordingly, any change in the operation of a data collection process in one data collection node can potentially affect the operation of a large number of data collection processes in other data collection nodes.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims. In a first embodiment of the present invention, a computer implemented method of adjusting a monitoring system is provided. The monitoring system includes a plurality of data collection nodes, each of said plurality of data collection nodes having one or more instances of at least one of a plurality of templates for configuring data collection at each of said plurality of data collection nodes, each of said instances collecting data according to one or more data collection rules specified in said plurality of templates. The method can include receiving a data propagation path specifying a hierarchy for at least a portion of said plurality of templates, said hierarchy specifying at least a first child template, one or more parent templates for said child template, and an order for said parent templates. The method can further include specifying at least one event data collection rule for said first child template and configuring one or more parent data collection rules for said parent templates based on said event data collection rule. The parent data collection rules can include at least one of a data retrieval rule for retrieving event data associated with said event data collection rule and a data aggregation rule for combining said event data associated with said event data collection rule and two or more instances of said first child template. The method also includes updating said instances in said plurality of data collection nodes based on said specifying and said configuring.

In a second embodiment of the present invention, a monitoring system is provided. The monitoring system can include a storage element for receiving a data propagation path specifying a hierarchy for at least a portion of a plurality of templates, said plurality of templates specifying data collection rules for plurality of data collection nodes, each of said plurality of data collection nodes having one or more instances of at least one of said templates, and said hierarchy specifying at least a first child template, one or more parent templates for said child template, and an order for said parent templates. The monitoring system can also include a processing element for configuring one or more parent data collection rules for said parent templates based on said event data collection rule and for updating said instances in said plurality of data collection nodes based on said configuring, wherein said dependent parent data collection rules comprise at least one of a data retrieval rule for retrieving event data associated with said event data collection rule and a data aggregation rule for combining said event data associated with said event data collection rule and two or more instances of said first child template.

In a third embodiment of the present invention, a computer-readable storage, having stored thereon a computer program for adjusting a monitoring system, is provided. The monitoring system can include a plurality of data collection nodes, each of said plurality of data collection nodes having one or more instances of at least one of a plurality of templates for configuring data collection at each of said plurality of data collection nodes, each of said instances collecting data according to one or more data collection rules specified in said plurality of templates. The computer program can include a plurality of code sections, the code sections executable by a computer for causing the computer to perform the step of receiving a data propagation path specifying a hierarchy for at least a portion of said plurality of templates, said hierarchy specifying at least a first child template, one or more parent templates for said child template, and an order for said parent templates. The code section can also cause the computer to specify at least one event data collection rule for said first child template and configuring one or more parent data collection rules for said parent templates based on said event data collection rule. The parent data collection rules can include at least one of a data retrieval rule for retrieving event data associated with said event data collection rule and a data aggregation rule for combining said event data associated with said event data collection rule and two or more instances of said first child template. The code section can also cause the computer to update said instances in said plurality of data collection nodes based on said specifying and said configuring.

DETAILED DESCRIPTION

Figure 1:
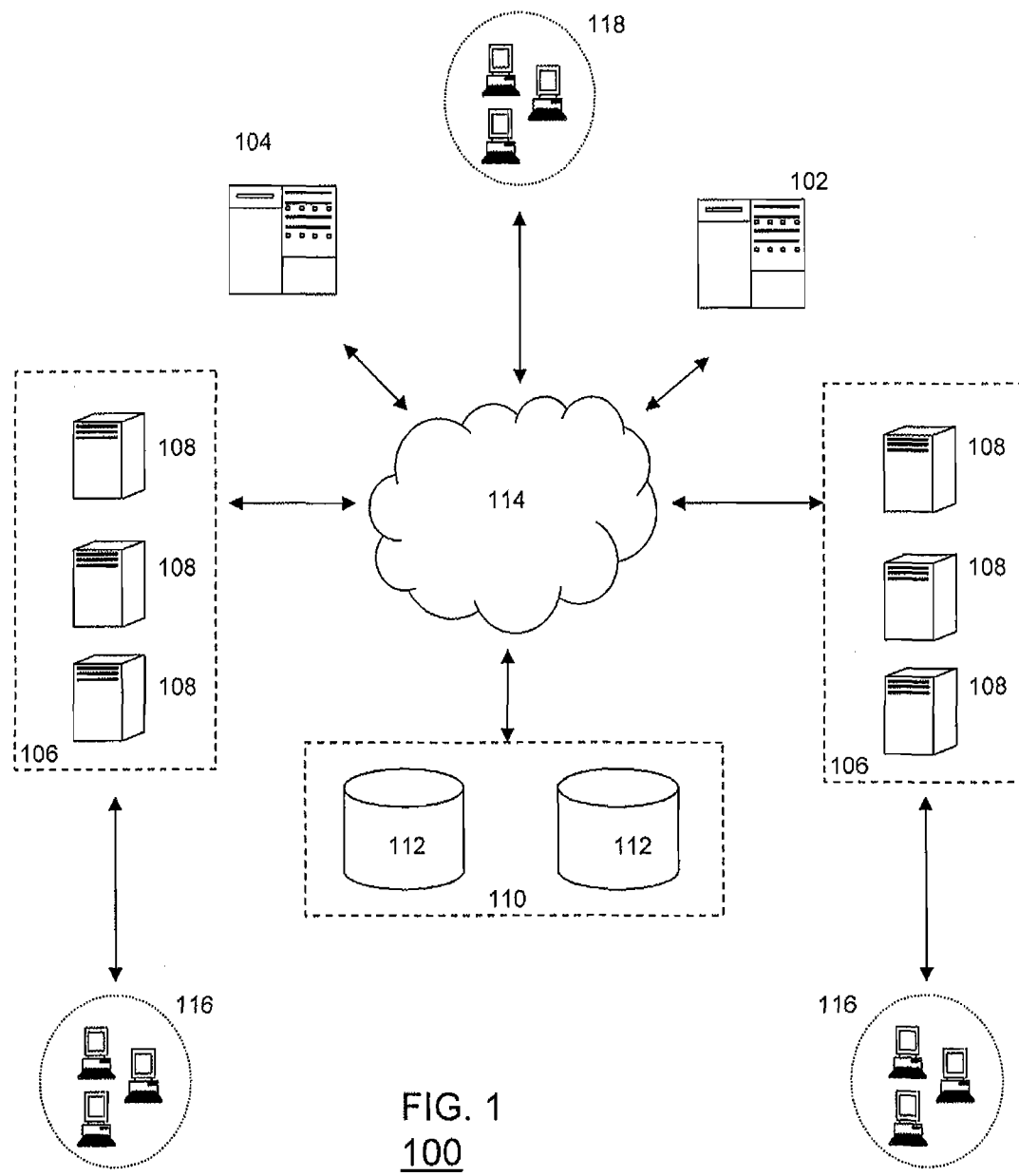
FIG. 1 is a schematic view of an exemplary monitoring system adapted for configuration of data collection rules according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention provide systems and methods for configuring data collection rules in a plurality of data collection nodes communicatively or operatively coupled according to a hierarchical data collection model. In a hierarchical data collection model, data flow among data collection processes at the various data collection nodes are organized into a tree-like structure. This structure allows duplication of data collection processes using parent/child relationships: each parent data collection process can have many children but each child data collection data collection process only has one parent. Accordingly, a change in any child data collection process can result in changes in the operation at multiple data collection nodes.

In conventional systems including hierarchical data collection models, users are typically required to manually update and verify data collection processes in each parent data collection process to reflect any changes are made in child data collection process. Although manually updating the operation of a small number of data collection processes is possible, manually adjusting the operation of a large number data collection processes can quickly become unwieldy. Furthermore, initial configuration of the data collection processes can also be difficult and time consuming. For example, assuming if a three-level hierarchical data collection model (seven data collection processes) is created and three values are collected by each of the child data collection processes at the bottom level (four of the seven data collection processes), the user would be required to create at least 18 data collection rules to combine and/or transfer the values collected by each of the child data collection processes to a data collection process at the top level of the data collection model.

The various embodiments of the present invention provide systems and methods for generating data collection rules for data collection process automatically. In particular, embodiments of the present invention can generate rules at different levels of the hierarchical data collection model based on a user specifying a data path from each child data collection process to a top most data collection process, including any intermediate data collection processes. Accordingly, rather than requiring the user to specify data collection rules for each data collection process, the various embodiments of the present invention can evaluate the data collection rules currently specified for each of the data collection processes and modify data collection rules in parent data collection processes based on any changes made in a child data collection process in the hierarchy.

Although the present invention will be described with respect to a few exemplary embodiments, the present invention may be embodied in many different forms and should not be construed as limited to the embodiments set forth herein.

For example, the present invention can be embodied as a method, a system, or a computer program product. Accordingly, the present invention can take the form as an entirely hardware embodiment, an entirely software embodiment or a hardware/software embodiment.

FIG. 1 is a schematic view of a exemplary monitoring system 100 configured to provide a web application network and configured for adjusting the configuration of data collection rules according to an embodiment of the present invention. The monitoring system 100 includes the typical components of a web application network, such as an authentication server 102 and a DNS server 104. The monitoring system 100 can also include one or more web server farms 106 having one or more web servers 108 operating therein. The web server farms 106 can also be communicatively coupled to a plurality of terminals 116 for running a web application. Additionally, the exemplary monitoring system 100 can also include a database server 110 including one or more databases 112. The authentication server 102, the DNS server 104, the web farms 106, and the database server 110 can be communicatively coupled via a network 114. An administrator interface 118 is also provided in system 100 to monitor data from all the components, as well as adjust the operation of each of the components of the system 100. In the illustrated embodiment, FIG. 1 depicts the various components of the monitoring system 100 as separate components. However, it is also within the scope of the present invention to combine the functions of one or more of these components into a single system or to provide a distributed system for performing these functions.

For the monitoring system 100 in FIG. 1, each of the components (or groups of similar components) can comprise a data collection node of the network 100 performing at least one data collection process. Accordingly, a hierarchical data collection map can be used to configure the flow of data between the various data collection processes operating in the monitoring system 100. This is conceptually illustrated in FIG. 2.

Figure 2:
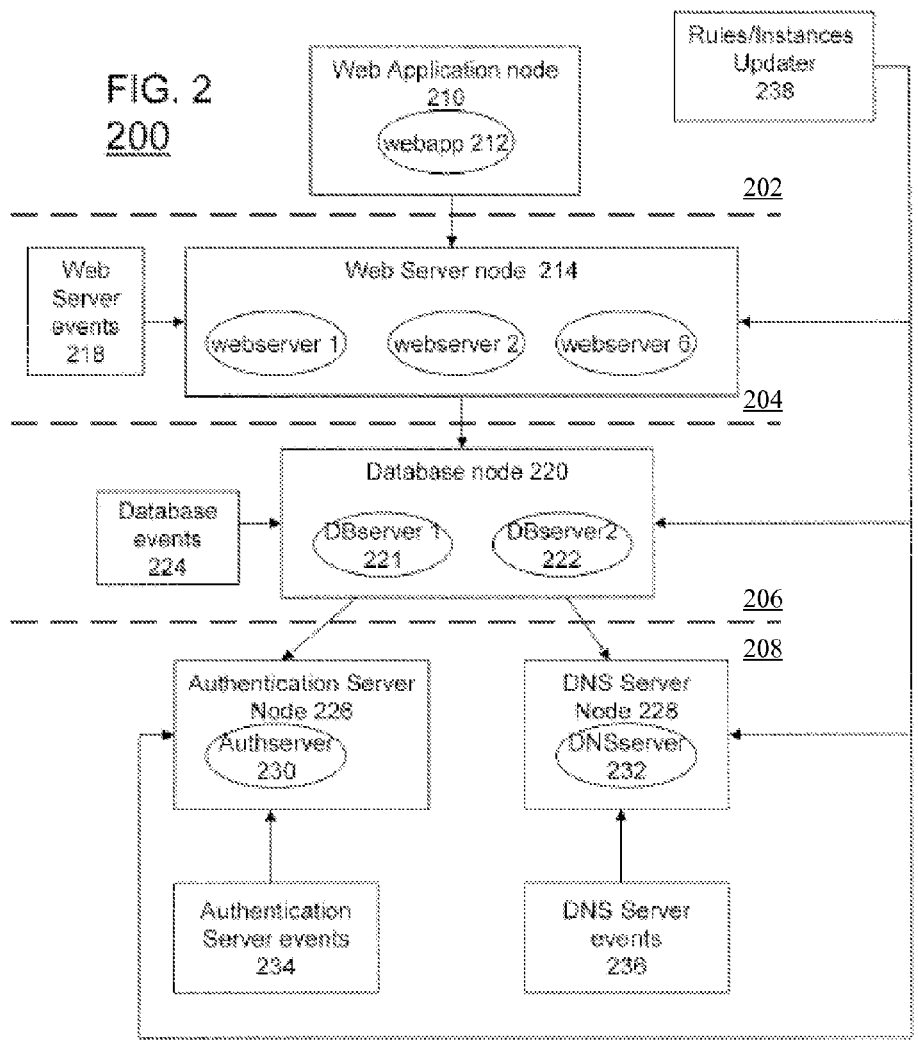
FIG. 2 is a schematic view of a hierarchical data collection model for the exemplary system in FIG. 1 according to an embodiment of the present invention.

FIG. 2 is a schematic view of the hierarchical data collection map 200 for a portion of exemplary monitoring system 100 in FIG. 1 according to an embodiment of the present invention. As shown in FIG. 2 the hierarchical data collection map 200 provides, from top to bottom, a web application level 202 level, a web server level 204, a database level 206, and an authentication/DNS (A/D) server level 208. Accordingly, data collection map 200 provides a data flow starting at A/D level 208 (bottom level) and ending at web application level 202 (top level). That is, at database level 206 a data collection node can potentially access data collected at the database level 206 or the A/D level 208. At the web server level 204, a data collection node can potentially access any data available at the database level 206 and data collected at the web server level 204. Finally, at the web application level 202, a data collection node can access any data available at the web server level 204 or the web application level 202.

As shown in FIG. 2, the web application level 202 includes web application data collection node 210. Such a node can comprise, for instance, terminals 116 or even administrator interface 118 in FIG. 1. Typically, in such data collection systems, the various nodes collect data based on the data collection processes associated with each node. In the case of a system including computer systems at each data collection node, the various data collection processes can be specified by utilizing templates. That is, a computer program, a computer system, or any combination thereof, that is preconfigured to perform one ore more tasks at a data collection node, including data collection processes. For example, as shown in FIG. 2, the web application node 210 includes the template webapp 212 for collecting data. One or more data collection rules can be specified for webapp 212. Although the web application node 210, via webapp 212, is not shown as retrieving any data locally, the present invention is not limited in this regard. In some embodiments, the webapp 212 can include data collection rules for monitoring local events. That is, for events at a local computer system executing a web application that can affect operation of the web application node 210.

As shown in FIG. 2, The webapp 212 template can be configured, via data collection rules, for retrieving data from the web server level 204 and in particular from the data collection processes at a web server node 204. In the exemplary map 200, a web server node 214 can comprise any type of web server system, such as web server farms 106 or web servers 108 in FIG. 1. The web server node 214 can also include templates for retrieving data. For example, as shown in FIG. 2, web server node 214 can include templates webserver1 215, webserver2 216, and webserver3 217. The templates 215-217 can be configured to retrieve data associated with web server events 217 events at the various web servers 108 in FIG. 1. That is, the data generated when a web server farm or a web server performs a particular type of operation. Such operations can include data processing or data transfer operations, for example. However, these operations can also include calculation of one or more metrics for evaluation of web farm or web server performance. In either case, to propagate this data to the web application node, the webapp 212 template is configured with data collection rules to retrieve the data from one or more of templates 215-217.

Templates are not limited only to monitoring of local events and events at lower levels, as described above, but for combining event data from multiple child templates at a next lower level. For example, webapp 212 can be configured with data collection rules for combining or aggregating the data retrieved from templates 215-217. Such aggregation can include, by way of example and not by way of limitation, obtaining the sum or the average of the data retrieved from templates 215-217 or finding a maximum or minimum value in the data retrieved from templates 215-217.

As with webapp 212, the templates 215-217 can be configured not only for receiving data responsive to web server event 208, but also for retrieving data from the database level 206 and in particular from templates in a database node 220. As a result, if webapp 212 also needs the data generated by templates in database node 220, the data is accessible via templates 215-217.

In the exemplary map 200, a database node 220 can comprise any type of database server system, such as database server 110 or databases 112 in FIG. 1. As with nodes 210 and 214, the database node 220 can also include templates for retrieving data. For example, as shown in FIG. 2, database node 220 can include templates DBserver1 221 and DBserver3 222. The templates 221, 222 can also be configured to retrieve data associated with database server events 224 events at the database server 110 or databases 112 in FIG. 1. For example, the data generated when a database server performs a particular type of operation. Such operations can include data processing or data transfer operations, for example. However, these operations can also include calculation of one or more metrics for evaluating performance of the database server or the various databases being accessed.

As with templates 215-217, the templates 221, 222 can be configured not only for receiving data responsive to database events 224, but also for retrieving data from a lower level, such as the A/D level 206 and in particular from a template in authentication server node 226 or a DNS server node 228. As previously described for templates 215-217, retrieval of data from nodes 226 or 228 by templates 221 and 222 allows templates at higher levels to access the data as well. In the exemplary map 200, an authentication server node 226 can comprise any type of authentication server system, such as authentication server 102 in FIG. 1 and the DNS server node 228 can comprise any type of DNS server system, such as DNS server system 104 in FIG. 1. Like web server node 214 and database node 220, The nodes 226 and 228 can also include templates for retrieving data. For example, as shown in FIG. 2, the authentication server node 226 can include template authserver 230 and the DNS server node 228 can include template DNSserver 232. The templates 230, 232 can also be configured to retrieve data associated with events 234 and 236 at the A/D level 206, such as events at the authentication server 102 or the DNS server 104 in FIG. 1. For example, the data generated when either of servers 102, 104 performs a particular type of operation. Such operations can include data processing or data transfer operations, for example. However, these operations can also include calculation of one or more metrics for evaluating performance of the database server or the various databases being accessed. Although four levels are shown in FIG. 2, the invention is not limited in this regard. The various embodiments of the present invention can be implemented using hierarchical data collection maps using any number of levels.

In the various embodiments of the present invention, the operation of the templates in the various data collection nodes can be adjusted via a rule/instances updating node communicatively coupled to the various node in the monitoring system. For example, as shown in FIG. 2, an updating node 238 is communicatively coupled to each of nodes 202-208. In the various embodiment of the present invention, the updating node 238 can be implemented using any type of computer system, as described below with respect to FIG. 5. For example, the administrative interface 118 in FIG. 1 can be configured for such a purpose. However, the present invention is not limited in this regard and other systems, such as terminals 116 can also be used as a rule/instance updating node 234. Operation of the updating node will be conceptually described with respect to FIG. 3

Figure 3:
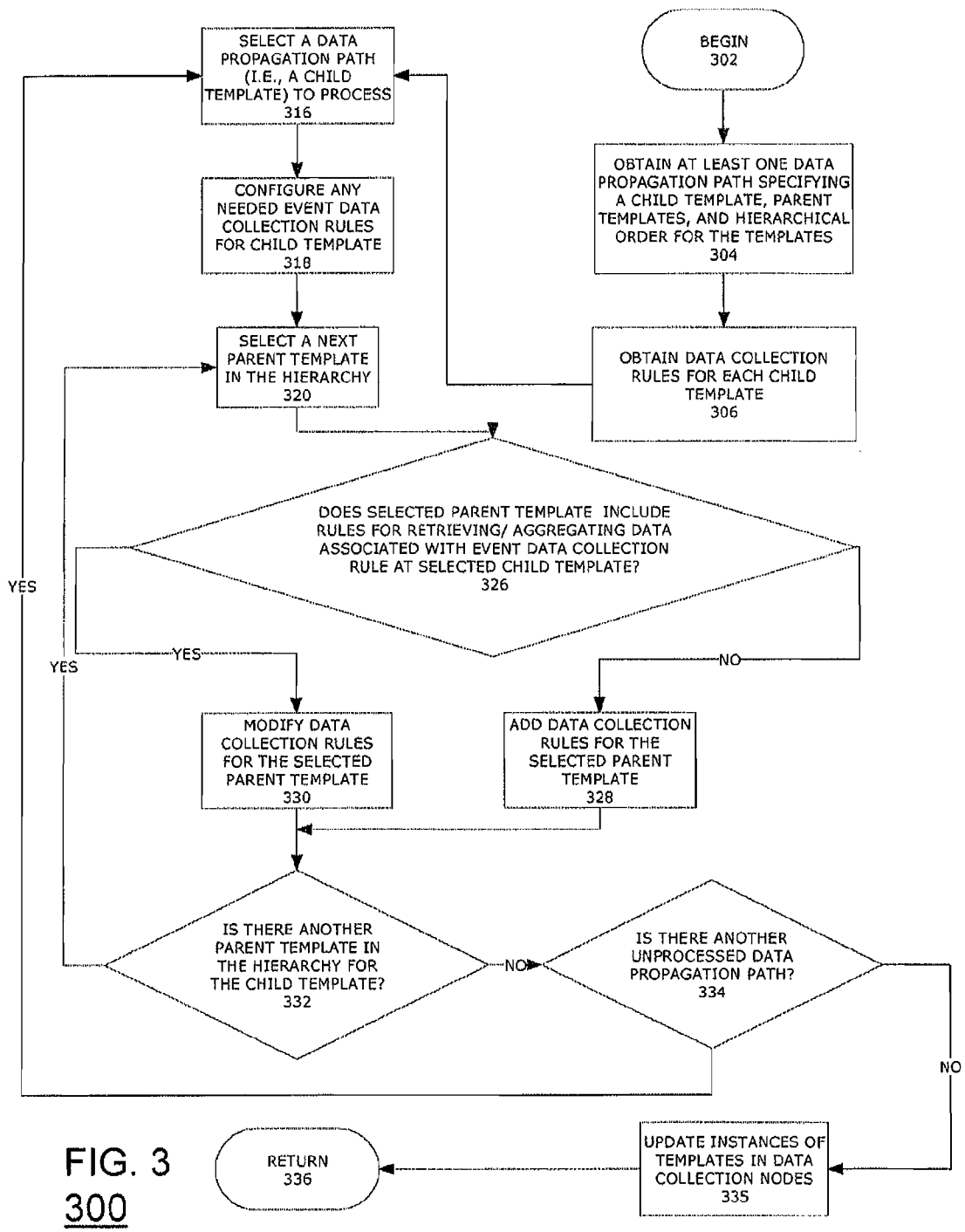
FIG. 3 is a flowchart of steps in an exemplary method for configuration of data collection rules in a monitoring system according to an embodiment of the present invention.

FIG. 3 is a flowchart of steps in an exemplary method 300 for automatic roll-up of data collection rules in a monitoring system according to an embodiment of the present invention. The method can begin with step 302 and continue to step 304. In step 304, at least one data propagation path can be provided. That is, a child template, the parent templates associated with the child template, and a hierarchical order of the parent templates with respect to one or more child templates can be provided. For example, with respect to FIG. 2, an exemplary data propagation path can specify authserver as a child template, DBserver, webserver, and webapp as the parent templates, where the order of the parent templates specifies the hierarchical order. Separately or in combination with step 304, data collection rules for the child templates for the data propagation paths can be specified in step 306. That is, the data collection rules for each child template to collect event data when implemented as an instance in a data collection node.

Once the data propagation paths and event data collection rules for child templates are obtained in steps 304 and 306, respectively, automatic updating can begin with step 316. In step 316, a first data propagation path can be selected. That is, a first child template is selected for processing. Once the child template is selected in step 316 by selection of the data propagation path, event data collection rules for the child template can be configured at step 318. That is, data collection rules for the template used in the child template are updated to provide any necessary data collection of local events. For example, referring back to FIG. 2, authserver 230 can be configured with an event data collection rule for authentication server events 234. However, the invention is not limited in this regard and the data collection rules for the template can also performing mathematical operations on the collected event data. For example, a data collection rule can specify obtaining an average value for a fixed time or for a fixed number of samples. Accordingly the data collection rules can specify collection of the data and/or the calculation of values based on the collected data.

Once the event data collection rules are established for the child template in step 318, data propagation rules for the parent templates can be updated. The update process occurs by selecting a next parent template in step 320 and subsequently performing an update of data collection rules associated the selected parent template. A "next parent template", as used herein, refers the next template in the data propagation path. For example, with reference to a child template, the next parent template would be the first parent template specified in the hierarchical order. With reference to a parent template, the next template in the hierarchical order with respect the selected parent node. Such a configuration ensures that data collected by a child template is propagated through the various templates, in order, according to the data propagation path.

Once the event data collection rules are updated for a selected child template in step 318 and a next parent template in the hierarchical order is selected in step 320, updating of the data collection rules in selected parent template can begin. In step 326, if the selected parent template does not include data collection rules for retrieving data associated with the child template, data collection rules can added to the selected parent template in step 328. That is, if the current data collection rules for the selected parent template fail to include at least a data retrieval rule, the data collection rules in the selected parent template are updated to retrieve the event data associated with the child node. Accordingly, a data collection rule can be provided specifies retrieval of the event data from the selected child template, either directly from the selected child template or indirectly via an intermediate parent template. Additionally, a data collection rule can also be provided for aggregating data from different instances of the selected child template. This is further described below with respect to FIG. 4.

If the selected parent template already has rules associated with the event data from the selected child template, the data collection rules for the parent template can be updated in step 330. That is, the data collection rules in the selected parent template are evaluated to verify that a dependency on the event data from the child template is still provided by the data collection rules. If modification of the data collection rules for parent template is needed, a similar process to the process in FIG. 4 can be performed to update data retrieval and data aggregation rules in the parent template.

Once the data collection rules for the selected parent template are updated or created in steps 326-330, the method 300 can determine if another parent template still needs to be processed for the selected child node. That is, a next parent template in the data propagation path. If another parent template is found in step 332, steps 320-330 can be repeated for the additional parent nodes in the data propagation path. If no other parent template is found in step 332, the method 300 can continue to step 334 to determine if another data propagation path needs to be processed. If another data propagation path needs to be processed in step 334, steps 316-332 can be repeated the next data propagation path specified. If no other data propagation paths are found in step 334, the method can continue to step 335.

In step 335, the instances of the various templates in the data collection nodes of a monitoring system can be updated. That is, the new or modified data collection rules for the templates in the various data propagation paths can be applied to the data collection nodes. As a result, the data collection nodes are prompted to re-collect, re-combine, and/or re-propagate data according to the new or updated data collection rules. The method can continue to step 336 to resume previous processing.

Although method 300 is shown as shown as processing each data propagation path and each parent node in series, the present invention is not limited in this regard. In other embodiments of the present invention, the various templates or various data propagation paths can be updated in parallel or using a combination of parallel and series steps.

Figure 4:
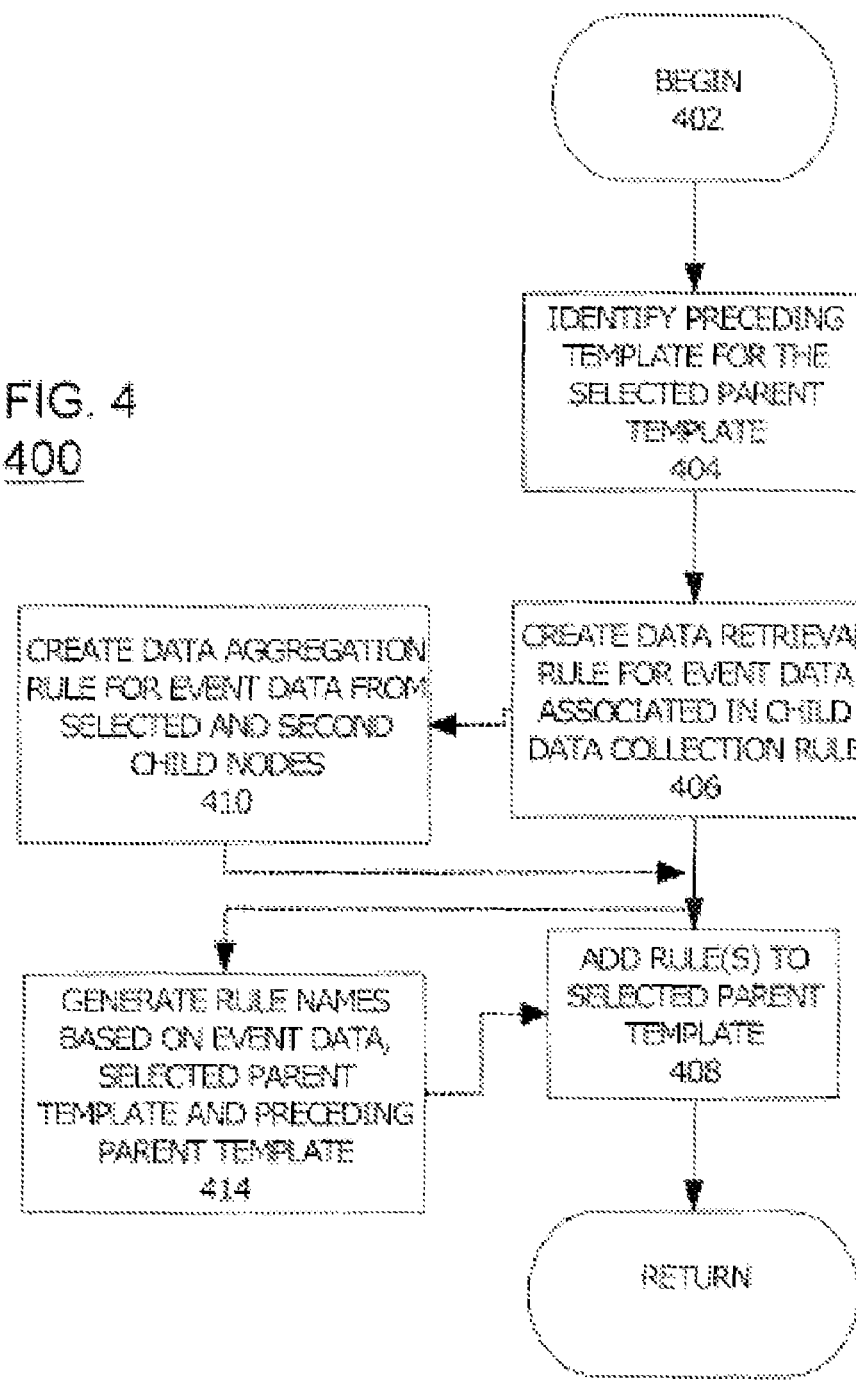
FIG. 4 is a flowchart of steps in an exemplary method for configuring data collection rules associated with event data for a child template in a parent template for the child node according to an embodiment of the present invention.

FIG. 4 is a flowchart of steps of an exemplary method for configuring data collection rules associated with event data of a child template for a parent template according to an embodiment of the present invention. For example method 400 can be performed during step 328 in FIG. 3. Method 400 can begin with step 402 and can continue to step 404. In step 404, the preceding template in the hierarchal order is identified. That is, for a selected parent template, the previous parent template specified in the data propagation path is identified. As previously described event data is propagated according to the hierarchical order. Therefore, in the various embodiments of the present invention, the selected parent node can be configured to retrieve data from the preceding template in the data propagation path. Once the preceding template is identified in step 404, a data retrieval rule can be generated in step 406. In particular, the added rule can specify retrieving the event data associated with the child template from the preceding template identified in step 404.

In some embodiments, the selected parent template can be used to propagate event data from the preceding template without modification and the method can proceed to step 408. However, in other embodiments, the selected parent template can utilize data from several child templates locally. In such embodiments, data aggregation rules can also be created for the parent template in step 410. That is, a rule for combining the event data from various instances of a same template can be created for the selected parent template. For example, if the preceding template is the child template of the data propagation path, the selected parent template can have a data aggregation rule for combining the data collected by various instances of the child template.

Once the data retrieval rules and/or data aggregation rules have been created in steps 406 (and 410), the rules can be added to the selected parent template in step 408 and method 400 can end and resume additional processing. However, in some embodiments, the rules can be added to the templates using a pre-defined naming convention that identifies the templates and the data associated with a particular data collection rule. Such a naming convention allows users to recognize the source of such data collection rules when, for example, debugging a group of data collection nodes with various instances of the templates specified in a data propagation path. The naming convention can be formatted in several ways. For example, one format for a data retrieval rule is:

EventData_SelectedParentTemplate_PrecedingParentTemplate.

In the case of a data aggregation rule, an exemplary format would be:

EventDataFunction_SelectedParentTemplate_PrecedingParentTemplate,
where the "Function" portion specifies the type of aggregation function used. These formats are presented by way of example, and not limitation. Accordingly, in the embodiments of the present invention utilizing such pre-defined naming conventions, any arrangement of template names and data type names can be used.

Figure 5:
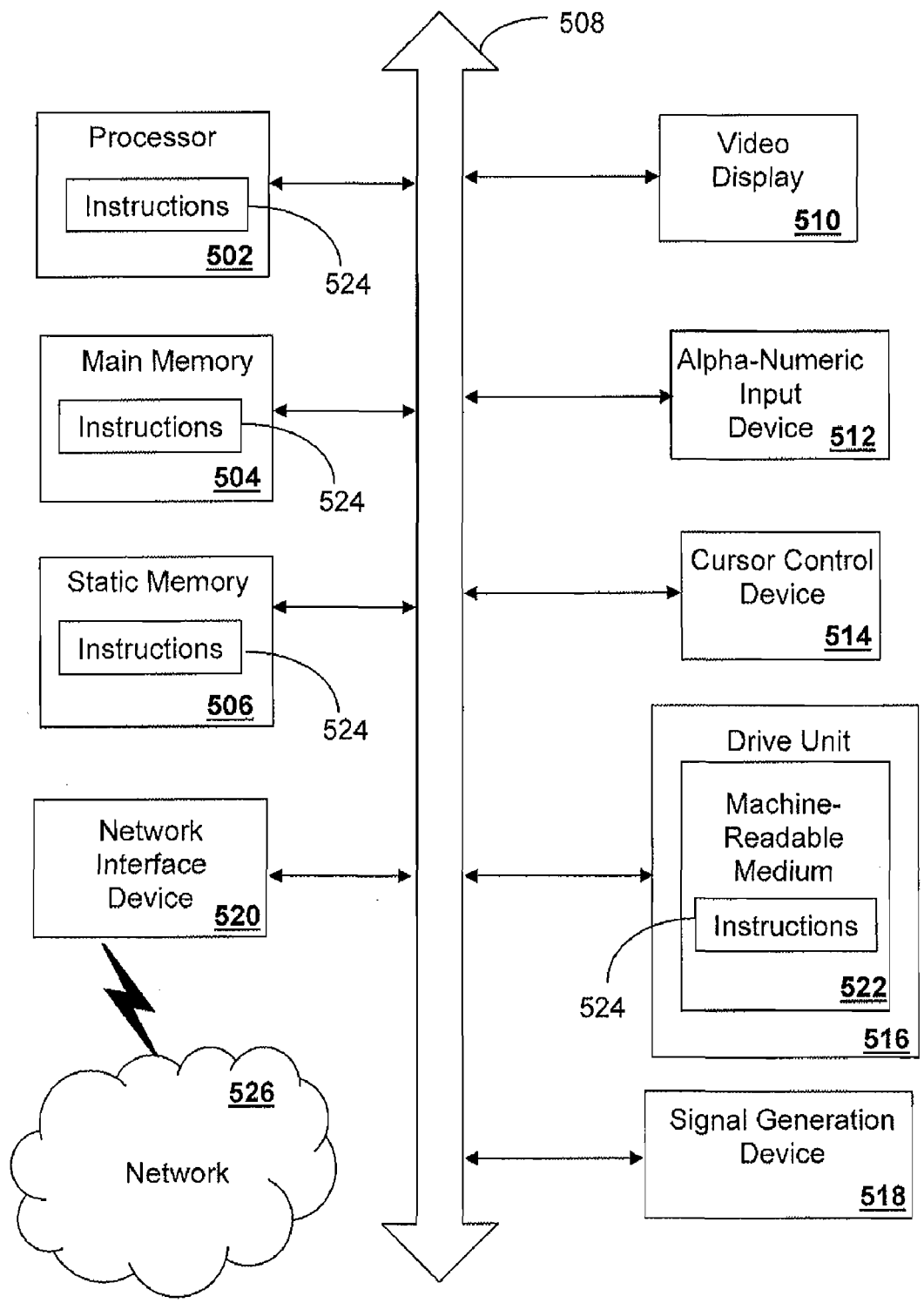
FIG. 5 is a schematic diagram of a computer system for executing a set of instructions that, when executed, can cause the computer system to perform one or more methodologies and procedures according to the various embodiments of the present invention.

FIG. 5 is a schematic diagram of a computer system 500 for executing a set of instructions that, when executed, can cause the computer system to perform one or more of the methodologies and procedures described above. In some embodiments, the computer system 500 operates as a standalone device. In other embodiments, the computer system 500 can be connected (e.g., using a network) to other computing devices. In a networked deployment, the computer system 500 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 500 can include a processor 502 (such as a central processing unit (CPU), a graphics processing unit (GPU, or both), a main memory 504 and a static memory 506, which communicate with each other via a bus 508. The computer system 500 can further include a display unit 510, such as a video display (e.g., a liquid crystal display or LCD), a flat panel, a solid state display, or a cathode ray tube (CRT)). The computer system 500 can include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 can include a computer-readable storage medium 522 on which is stored one or more sets of instructions 524 (e.g., software code) configured to implement one or more of the methodologies, procedures, or functions described herein. The instructions 524 can also reside, completely or at least partially, within the main memory 504, the static memory 506, and/or within the processor 502 during execution thereof by the computer system 500. The main memory 504 and the processor 502 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 524 or that receives and executes instructions 524 from a propagated signal so that a device connected to a network environment 526 can send or receive voice and/or video data, and that can communicate over the network 526 using the instructions 524. The instructions 524 can further be transmitted or received over a network 526 via the network interface device 520.

While the computer-readable storage medium 522 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A computer implemented method of adjusting a monitoring system, said monitoring system comprising a plurality of data collection nodes, each of said plurality of data collection nodes having one or more instances of at least one of a plurality of templates for configuring data collection at each of said plurality of data collection nodes, the method comprising:
    receiving a data propagation path specifying a hierarchy for at least a portion of said plurality of templates, said hierarchy specifying at least a first child template, one or more parent templates for said first child template, and an order for said parent templates;
    specifying at least one event data collection rule for said first child template which defines a child data collection process for collecting first event data associated with a first event;
    configuring at least one first parent data collection rule for each of said parent templates which defines a parent data collection process, said parent data collection rule comprising at least one of a data retrieval rule for retrieving said first event data and a data aggregation rule for combining said first event data collected by at least two of said first child template;
    changing said child data collection process;
    automatically evaluating said first parent data collection rules to determine if one or more of said parent data collection processes implemented by said parent templates need to be updated to reflect a change of said child data collection process; and
    automatically updating at least one process of said parent data collection processes based at least on said change of said child data collection process if it is determined that said process needs to be updated, wherein said process is updated by modifying said first parent data collection rule of at least one of said parent templates.

2. The method of claim 1, wherein if at least one of said parent data collection rules comprises a data retrieval rule, said data retrieval rule specifies retrieving said first event data associated with said event data collection rule from a previous one of said plurality of templates according to said order in said hierarchy.

3. The method of claim 1, wherein said child data collection process is changed such that second event data is collected when a second event occurs, and said process is updated by adding to a respective parent template of said parent templates a second parent data collection rule for collecting said second event data.

4. The method of claim 3, wherein said process is further updated by adding to said respective parent template of said parent templates at least one third parent data collection rule for combining said second event data collected by said two instances of said first child template.

5. The method of claim 4, further comprising:
    generating a name for each of said second data parent collection rule and said third parent data collection rule, said name specifying said event data collection rule associated with said second and third parent data collection rules and said respective parent template, and a template which precedes said respective parent template in said data propagation path.

6. The method of claim 4, wherein said third parent data collection rule comprises at least one among a rule for obtaining a sum of said second event data retrieved from said two instances of said first child template, a rule for obtaining an average value of said second event data retrieved from said instances of said first child template, a rule for obtaining a maximum value from said second event data retrieved from said two instances of said first child template, and a rule for obtaining a minimum value from said second event data retrieved from said two instances of said first child template.

7. A monitoring system, comprising:
    a storage element configured to receive a data propagation path specifying a hierarchy for at least a portion of a plurality of templates, said plurality of templates specifying data collection rules for a plurality of data collection nodes, each of said plurality of data collection nodes having one or more instances of at least one of said templates, and said hierarchy specifying at least a first child template, one or more parent templates for said first child template, and an order for said parent templates; and
    at least one processing element configured to
        specify at least one event data collection rule for said first child template which defines a child data collection process for collecting first event data associated with a first event,
        configure at least one first parent data collection rule for each of said parent templates which defines a parent data collection process,
        change said child data collection process,
        automatically evaluate said first parent data collection rule to determine if one or more of said parent data collection processes implemented by said parent templates need to be updated to reflect a change of said child data collection process, and
        automatically update at least one process of said parent data collection processes based at least on said change of said child data collection process if it is determined that said process needs to be updated, wherein said process is updated by modifying said first parent data collection rule of at least one of said parent templates;
    wherein said parent data collection rule comprises at least one of a data retrieval rule for retrieving said first event data and a data aggregation rule for combining said first event data collected by at least two instances of said first child template.

8. The system of claim 7, wherein if at least one of said parent data collection rules comprises a data retrieval rule, said data retrieval rule specifies retrieving said first event data associated with said event data collection rule from a previous one of said plurality of templates according to said order in said hierarchy.

9. The system of claim 7, wherein said child data collection process is changed such that second event data is collected when a second event occurs, and said process is updated by adding to a respective parent template of said parent templates a second parent data collection rule for collecting said second event data.

10. The system of claim 9, wherein said process is further updated by:
adding to a respective parent template of said parent templates at least one third parent data collection rule for combining said second event data collected by said two instances of said first child template.

11. The system of claim 10, wherein said processing element is configured to generate a name for each of said second parent data collection rule and said third parent data collection rule, said name said specifying said event data collection rule associated with said second and third parent data collection rules and said respective parent template, and a template which precedes said respective patent template in said data propagation path.

12. The system of claim 11, wherein said third parent data collection rule comprises at least one among a rule for obtaining a sum of said second event data retrieved from said two instances of said first child template, a rule for obtaining an average value of said second event data retrieved from said two instances of said first child template, a rule for obtaining a maximum value from said second event data retrieved from said two instances of said first child template, and a rule for obtaining a minimum value from said second event data retrieved from said two instances of said first child template.

13. A non-transitory computer-readable storage medium having stored thereon a computer program for adjusting a monitoring system, said monitoring system comprising a plurality of data collection nodes, each of said plurality of data collection nodes having one or more instances of at least one of a plurality of templates for configuring data collection at each of said plurality of data collection nodes, each of said instances collecting data according to one or more data collection rules specified in said plurality of templates, the computer program executable by a computer for causing the computer to perform the steps of:
receiving a data propagation path specifying a hierarchy for at least a portion of said plurality of templates, said hierarchy specifying at least a first child template, one or more parent templates for said child template, and an order for said parent templates;
specifying at least one event data collection rule for said first child template which defines a child data collection process for collecting first event data associated with a first event;
configuring at least one first parent data collection rule for each of said parent templates which defines a parent data collection process, said parent data collection rule comprising at least one of a data retrieval rule for retrieving said first event data and a data aggregation rule for combining said first event data collected by at least two instances of said first child template;
changing said child data collection process;
automatically evaluating said first parent data collection rules to determine if one or more of said parent data collection processes implemented by said parent templates need to be updates to reflect a change of said child data collection process; and
automatically updating at least one process of said parent data collection processes based at least on said change of said child data collection process if it is determined that said process needs to be updated, wherein said process is updated by modifying said first parent data collection rule of at least one of said parent templates.

14. The computer-readable storage of claim 13, wherein if at least one of said parent data collection rules comprises a data retrieval rule, said data retrieval rule specifies retrieving said first event data associated with said event data collection rule from a previous one of said plurality of templates according to said order in said hierarchy.

15. The computer-readable storage of claim 13, wherein said child data collection process is changed such that second event data is collected when a second event occurs, and said process is updated by adding to a respective parent template of said parent templates a second parent data collection rule for collecting said second event data.

16. The computer-readable storage of claim 15, wherein said process is further updated by adding to said respective parent template of said parent templates at least one third parent data collection rule for combining said second event data retrieved by said two instances of said first child template.

17. The computer-readable storage of claim 16, further comprising:
generating a name for each of said second parent data collection rule and said third new data collection rules, said name specifying said event data collection rule associated with said second and third parent data collection rules and said respective template, and a template which precedes said respective parent template in said data propagation path.

18. The computer-readable storage of claim 16, wherein said third parent data collection rule comprises at least one among a rule for obtaining a sum of said second event data from said two instances of said first child template, a rule for obtaining an average value of said second event data from said two instances of said first child template, a rule for obtaining a maximum value from said second event data from said two instances of said first child template, and a rule for obtaining a minimum value from said second event data from said two instances of said first child template.

* * * * *